United States Patent [19]

Kung et al.

[11] Patent Number: 5,337,178
[45] Date of Patent: Aug. 9, 1994

[54] TITLABLE OPTICAL MICROSCOPE STAGE

[75] Inventors: Paul J. Kung, Hopewell Junction; David E. Sloman, Poughkeepsie, both of N.Y.

[73] Assignee: International Business Machines Corporation, Armonk, N.Y.

[21] Appl. No.: 996,262

[22] Filed: Dec. 23, 1992

[51] Int. Cl.[5] .............................. G01N 21/01; 359 391; 359 392; 359 393; 250 442.11
[52] U.S. Cl. ....................... 359/393; 250/442.11
[58] Field of Search ................. 359/391, 392, 393; 250/442.11

[56] References Cited

U.S. PATENT DOCUMENTS

| | | | |
|---|---|---|---|
| 3,629,577 | 12/1971 | Weber et al. | 250/442.11 |
| 3,778,621 | 12/1973 | Mikajiri | 250/442.11 |
| 3,826,558 | 7/1974 | Rasberry et al. | |
| 4,425,507 | 1/1984 | Panov et al. | 250/442.11 |
| 4,627,009 | 12/1986 | Holmes et al. | 359/393 |
| 5,001,351 | 3/1991 | Boksem | 250/442.11 |

FOREIGN PATENT DOCUMENTS

| | | |
|---|---|---|
| 55-93114 | 7/1980 | Japan . |
| 1485185 | 6/1989 | U.S.S.R. . |

*Primary Examiner*—Edward K. Look
*Assistant Examiner*—James A. Larson
*Attorney, Agent, or Firm*—Laurence R. Letson

[57] ABSTRACT

An X-Y microscope stage is provided with a tiltable support for a specimen. The specimen may be tilted about the tilt axis to re-orient the specimen for viewing. The re-orientation of the specimen may require a small adjustment in the X or Y direction and a subsequent refocus of the microscope optics.

5 Claims, 1 Drawing Sheet

TITLABLE OPTICAL MICROSCOPE STAGE

FIELD OF THE INVENTION

This invention relates to microscope stages, and more specifically to a microscope stage for supporting a specimen within the view of a microscope whereby the specimen may be rotated about a predetermined axis of rotation for inspection from a different perspective.

BACKGROUND OF THE INVENTION

The inspection of specimens which have been sectioned or ground to produce a surface passing through a region of interest, in many cases a defect in a device, previously required that the specimen be mounted on a support such as a microscope stage and inspected either from only one direction or that the item be removed, re-attached, and then repositioned within the view of the microscope for inspection from a second viewing direction. In most cases, this specimen removal, re-attachment and subsequent reposition within the field of view of the microscope is laborious and time consuming. For example, if an electronic chip which typically comprises a ceramic chip and/or a ceramic substrate, each containing a large number of insulating and conducting deposits or layers, is suspected of being defective, and an optical inspection reveals a particular area to be more closely considered, the electronic chip then is sectioned or successively ground to different planes. The planes may be perpendicular or beveled at an angle to the plane of the surface through which the optical inspection has occurred to locate the potential defect. As the potential defect is sectioned, it is often desirable to observe the area of interest from angles other than a top surface.

After the area of interest has been sectioned either on a plane acutely angled or perpendicular to the plane of the top surface of the device, then it is extremely difficult to identify again the region of interest; that region viewed from a different direction may appear very different than the originally viewed area. Accordingly, it is extremely time consuming and laborious to re-locate and re-identify the region to be inspected.

An alternative to the removal, re-attachment, reinstallation and relocation of the specific area being inspected, as described above, is the use of two microscopes disposed for viewing at an angle to each other such that a selected area may be inspected from one direction through one microscope and then the area inspected from another direction through the second microscope. The significant disadvantage to this technique over and above a requirement of two microscopes and expensive redundancy in equipment, is that the two microscopes must be positioned relative to each other with extreme precision, in order for both to be able to view the region being inspected.

The foregoing approach to remove the sample, move and re-attach it on the holder and then to re-install the sample only provides the viewer with two possible views of the region being inspected. The first position being that where the defect was originally identified and exposed; the second position being the position into which the sample has been moved following its removal, re-attachment and re-installation into the microscope viewing assembly. These two positions may not provide the best view of the area being inspected in order to identify and to analyze that region. If that region is a defect, it may be particularly desirable to view the region from a plurality of closely associated or varying positions. Whenever it is necessary to view the sample in a multitude of different positions, each requiring the removal and reposition of the sample on to the holder and the subsequent re-installation of the holder into the optical inspection assembly, a complete analysis of the area being viewed becomes too expensive in terms of time and effort as well as being a slow and laborious process.

The disadvantages of this approach prevent the efficient inspection of selected regions of samples from a plurality of different angular views.

SUMMARY OF THE INVENTION

A microscope stage having an X-Y positioning capability may be adapted to support a sample for visual inspection or viewing in such a way that the sample may be rotated about a predetermined axis parallel to one of the X or Y axes. By rotating the sample about a predetermined axis, the sample may be viewed from a number of angular orientations enhancing the utility of the device significantly.

An X-Y stage of a microscope is modified to support a pair of vertically oriented plates. The plates are spaced apart from each other to provide an area or region between them which will permit the suspension of a swing plate between the vertically oriented plates. The swing plate will support a specimen block which has the sample electronic chip attached on one of its surfaces such that the top surface of the electronic chip, that being the surface opposite the ceramic or silicon substrate, is positioned closest to the microscope lens.

The chip may be positioned to extend outwardly from the specimen block so that the chip is cantilevered from its supporting surface and the chip is thereby exposed for grinding. The specimen block with affixed sample chip may be positioned with the swing plate in a first position and the swing plate locked for stability. When a defect or a region which is of particular interest is located, the specimen block with affixed chip may be removed from the swing plate and the edge of the electronic chip may be ground away to expose the region of interest in cross-section.

The chip surface that is exposed by grinding may be oriented at any desired angle, but preferably is perpendicular to at least the top face of the electronic chip. In some cases it may be desirable to bevel the exposed face at a 45° angle or other desired angular orientation. The specimen block with affixed chip then may be re-installed onto the swing plate with a high degree of precision, and the region of interest may be inspected or observed through the microscope without any additional X, Y or Z stage adjustments. The swing plate then may be rotated about its pivot axis and the defect or region being inspected observed during this rotation. The swing support is accurately located by virtue of its pivot points and, therefore, whenever the specimen is re-installed in the microscope stage assembly, the specimen is returned to the same position it occupied prior to removal.

Repositioning of the sample within the field of view of the microscope, following swing plate rotation, may be readily accomplished by a single axial movement along either the X or the Y axis, depending upon the orientation of the swing support, and a small refocusing correction to compensate for the vertical shift of the surface being observed during the rotation.

The tiltable optical microscope stage provides the advantage to easily observe a sample from a plurality of angular rotations by means of very simple relocation of the sample through a single axial movement and the subsequent refocus of the microscope after tilting the specimen. This device overcomes the disadvantages of the prior art devices as well as provides significant benefits to the user not available from the prior art devices.

DRAWINGS

Figure 1:
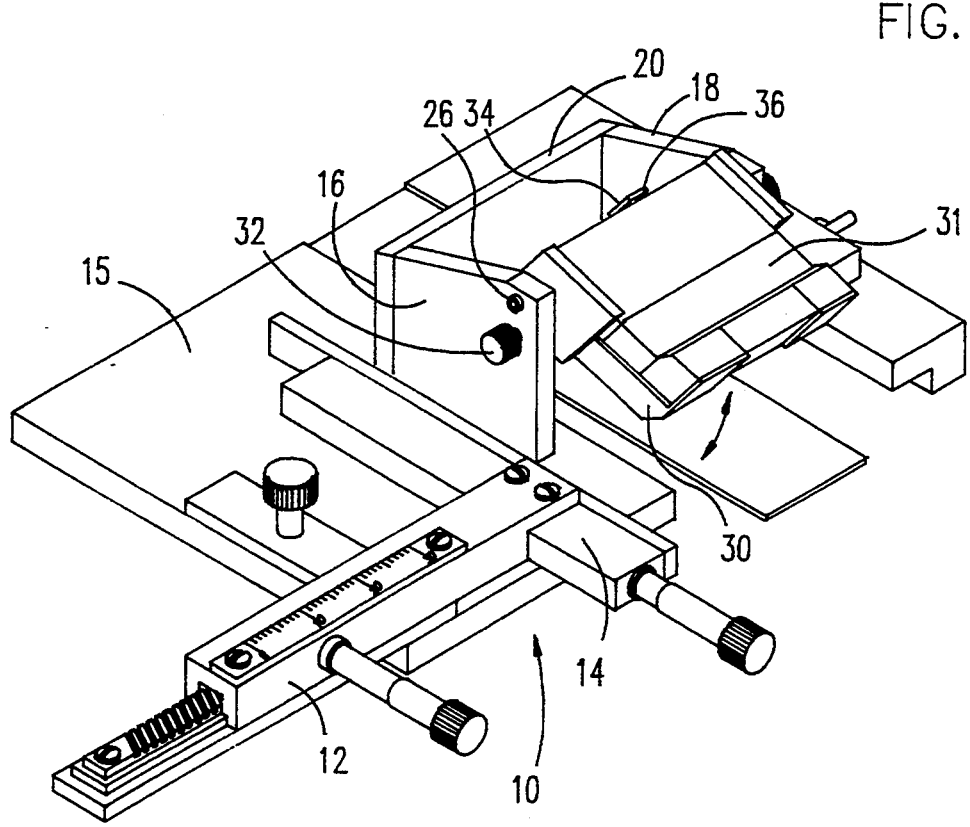
FIG. 1 is a left elevated perspective view of the tiltable optical microscope stage.
Figure 2:
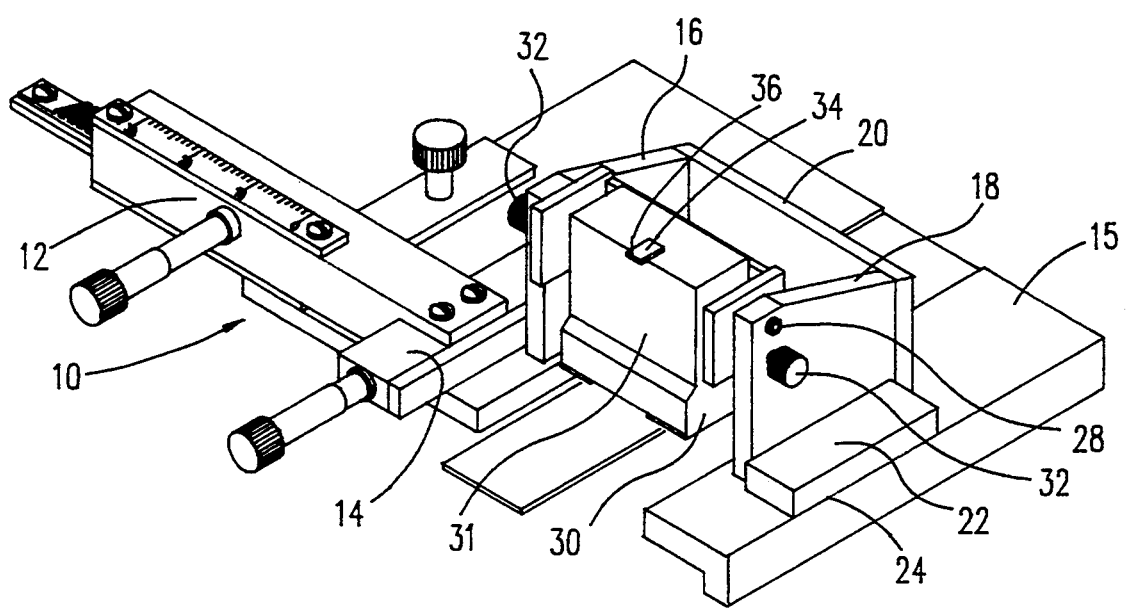
FIG. 2 is a right elevated perspective view of the tiltable optical microscope stage.

DETAILED DESCRIPTION OF THE BEST MODE OF THE PREFERRED EMBODIMENT FOR CARRYING OUT THE INVENTION

Referring to the drawings, an X-Y microscope stage 10 of conventional design is provided as a basis for this invention. The X-Y microscope stage 10 typically includes two displacement drives, an X displacement drive 12 and a Y displacement drive 14. These drives 12, 14 may be of any suitable type such as a rack and pinion drive or a screw and follower nut design. By operating one or both of the drives 12, 14, a microscope field of view may be positioned relative to the specimen 34 such that the field of view may be positioned at any point in the viewing region within the displacement limits of the X drive 12 and Y drive 14.

Attached to the movable portion or the output of the X and Y drives 12 and 14 is an assembly of at least two vertically oriented plates 16, 18. Plates 16, 18 are positioned parallel to each other and may be stabilized with a back plate 20 spanning the opening between plates 16 and 18. This structure is further supported on the outboard or unattached plate 18 by a block 22 which supports plate 18 on plate 15 while at the same time providing a smooth surface 24 on the bottom of block 22 to engage support plate 15. The smooth surface of block 22 permits the relatively easy movement shift of the assembly comprising plates 16, 18 by the use of X drive 12 or Y drive 14. Plates 16 and 18 are further provided with pivots 26 and 28, respectively, which are located near the top of plates 16 and 18. These pivots 26, 28 in turn support the swing support 30 and permit the movement of swing support 30 through a range of positions. Plates 16 and 18 are further provided with locking screws 32 which may be tightened by the operator to hold the swing support 30 in any position within its range of movement and thereby prevent movement of swing support 30 and any sample 34, attached thereto.

The sample 34 may be attached to the specimen block 31, and positioned on the swing support 30 which is a holding device for specimen block 31 and may be tilted about pivots 26, 28, as illustrated for observation through a microscope. The specimen 34 is typically attached to the specimen block 31 by means of epoxy cement or other similar material with sufficient strength to hold the sample 34 as the sample is being ground to expose a new surface 36. As the specimen 34 is inspected, it may be inspected from a direction substantially perpendicular to the top face of sample 34 when oriented by the swing support 30 being positioned in substantially a horizontal position. As a region is identified which warrants further inspection in sectional view, the surface 36 of the specimen 34 may be ground away to expose the region of interest at the surface 36. The swing support 30 then may be lowered by loosening the locking screws 32 with the weight of swing support 30 acting to pull the swing support 30 downward. The swing support 30 may be lowered in angular increments or may be completely lowered as desired and locking screws 32 retightened.

As the specimen 34 is repositioned, the specific area to be observed will shift slightly inasmuch as it is not necessarily located on the axis of pivots 26, 28. Even with this slight misalignment, a small adjustment by the Y drive 14 will bring the specimen 34 and, specifically, the region being observed back into view of a microscope. It should be noted that since the axis of pivots 26, 28 is parallel to the movement created by the X drive 12 of the microscope stage 10, the movement of the region being observed, during rotation of the specimen 34, will be in the Y direction.

Likewise, a small shift in the Z direction of the region being observed on the specimen 34 will require a slight compensation in the focus of the microscope inasmuch as the region being observed either may be slightly elevated or slightly depressed from its previous height. Accordingly, with a small focus correction it then will be simple to scan a single line across the specimen 34, in particular across surface 36, to relocate and position the region to be observed precisely in the view of the microscope. By traversing the surface 36 in along the X axis, the viewing field will cross the region of interest because the specimen 34 has not been displaced along the Y axis. There no longer remains the requirement for a search in both the X and Y directions for the area to be observed.

The closer the surface 36 resides to the axis of pins 26, 28, the smaller the corrections in the Y focus parameters need be. The swing support 30 may be fabricated as a permanently mounted member of the microscope stage 10 such that it will support a specimen block 31 of fairly precise dimensions. The specimen block 31 then may be readily removed for grinding of the specimen 34 and repositioned with no substantial relative displacement of the specimen 34 and the microscope viewing field.

With removable and replaceable specimen blocks 31, the feasibility and efficiency of the tiltable optical microscope stage is still further increased.

It should be understood that minor modifications may be made to the device described above without departing from the scope of the claims to follow.

We claim:

1. A tiltable optical microscope stage comprising:

a base member;

a specimen support slideably supported by said base member, said specimen support comprising a pair of pivots defining a pivot axis;

a means for controlling two dimensional movement attached to said specimen support and to said base member for controlling movement of said specimen support relative to said base member;

a tiltable specimen holding means for holding a specimen in a position relative to said specimen support and suspended from said pair of pivots, aid pivot axis extending through said specimen holding means and said specimen holding means tiltable about said axis; and a locking means for locking said specimen holding means in a selected position, whereby a specimen may be translated in at least one direction and tilted about an axis parallel to said one direction to position said specimen at varying orientations relative to said base member.

2. The tiltable optical microscope stage of claim 1 wherein said locking means comprises at least one locking screw extending between said specimen support and said specimen holding means.

3. The tiltable optical microscope stage of claim 1 wherein said specimen holding means comprises a specimen block onto which a specimen may be mounted and a tiltable specimen block holding means for receiving said specimen block.

4. A fixture for attachment to a microscope for positioning a specimen for viewing from a plurality of directions, comprising:
   means for attaching said fixture to a microscope;
   means for positioning said specimen on a predetermined axis of rotation;
   means for positioning said specimen about said axis of rotation in a plurality of positions; and
   means for locking said means for positioning said specimen about said axis of rotation,
   whereby said specimen may be viewed from a plurality of directions relative to said specimen.

5. The fixture of claim 4 further comprising means for displacing said specimen in two orthogonal directions.

* * * * *